United States Patent
von der Goltz

(10) Patent No.: US 9,540,083 B2
(45) Date of Patent: Jan. 10, 2017

(54) SYSTEM AND METHOD FOR UNDERWATER OBSERVATION

(71) Applicant: Canopy Enterprises, Inc., Miami, FL (US)

(72) Inventor: Harald Joachim Freiherr von der Goltz, Key Biscayne, FL (US)

(73) Assignee: CANOPY ENTERPRISES, INC., Miami, FL (US)

( * ) Notice: Subject to any disclaimer, the term of this patent is extended or adjusted under 35 U.S.C. 154(b) by 0 days.

(21) Appl. No.: 14/507,074

(22) Filed: Oct. 6, 2014

(65) Prior Publication Data

US 2015/0151818 A1 Jun. 4, 2015

Related U.S. Application Data

(63) Continuation of application No. 13/735,001, filed on Jan. 6, 2013, now Pat. No. 8,869,724.

(Continued)

(51) Int. Cl.
*B63B 35/00* (2006.01)
*B63C 11/49* (2006.01)
(Continued)

(52) U.S. Cl.
CPC .............. *B63C 11/49* (2013.01); *B63B 1/10* (2013.01); *B63B 17/02* (2013.01); *B63B 29/02* (2013.01);
(Continued)

(58) Field of Classification Search
CPC ...................................................... B63C 11/49
(Continued)

(56) References Cited

U.S. PATENT DOCUMENTS 385,656 A 7/1888 Belisle
3,254,621 A 6/1966 White
(Continued)

FOREIGN PATENT DOCUMENTS

EP 277068 A1 8/1988
FR 2739828 A1 4/1997
(Continued)

OTHER PUBLICATIONS

"Ego Compact Semi Submarine", www.egosubmarine.com/07company.htm, Jun. 9, 2014.
(Continued)

*Primary Examiner* — Stephen Avila
(74) *Attorney, Agent, or Firm* — Guntin & Gust, PLC; Ralph Trementozzi

(57) ABSTRACT

A system that incorporates teachings of the subject disclosure may include, for example, a water vehicle including a deck that accommodates a group of passengers above a waterline and an observation gondola accommodating the group of passengers below the waterline. The access between the observation gondola and the deck is provided by way of an aperture in a top of the observation gondola. The observation gondola includes a transparent floor and walls allowing the group of passengers to enjoy an underwater experience without exposure to the water and while maintaining an unobstructed panoramic view of the underwater environment. The underwater observation gondola can include a substantially open top, which may include a sun screen or weather protective cover. The open top exposes the observation gondola to fresh air, while alleviating any claustrophobic sensations as might otherwise be experienced by passengers during underwater observation. Other embodiments are disclosed.

20 Claims, 8 Drawing Sheets

Related U.S. Application Data

(60) Provisional application No. 61/583,344, filed on Jan. 5, 2012.

(51) Int. Cl.
   *B63B 35/73* (2006.01)
   *B63B 17/02* (2006.01)
   *B63B 29/02* (2006.01)
   *B63B 1/10* (2006.01)
   *B63B 1/12* (2006.01)
   *B63J 3/00* (2006.01)

(52) U.S. Cl.
   CPC ............... *B63B 35/73* (2013.01); *B63B 1/121* (2013.01); *B63J 2003/003* (2013.01); *Y02T 70/70* (2013.01)

(58) Field of Classification Search
   USPC .......................................................... 114/66
   See application file for complete search history.

(56) References Cited

U.S. PATENT DOCUMENTS

| | | |
|---|---|---|
| 3,680,515 A | 8/1972 | Yoneda |
| 3,688,720 A | 9/1972 | Lok |
| 3,895,495 A | 7/1975 | Akazaki et al. |
| 4,087,980 A | 5/1978 | Kono et al. |
| 4,423,695 A | 1/1984 | Rougerie |
| 4,494,472 A | 1/1985 | Rougerie |
| 4,548,148 A | 10/1985 | Bloomfield et al. |
| 4,565,145 A | 1/1986 | Mayall |
| 4,763,952 A | 8/1988 | Gaudreau |
| 4,823,722 A | 4/1989 | Gass |
| 4,928,614 A | 5/1990 | Forman |
| 4,938,164 A | 7/1990 | Onofri |
| 5,010,835 A | 4/1991 | Kunitake |
| 5,117,774 A | 6/1992 | English |
| D343,380 S | 1/1994 | Wortham |
| 5,315,952 A | 5/1994 | Jackson |
| 5,337,692 A | 8/1994 | Troiani |
| 5,988,088 A | 11/1999 | Ishida |
| 6,145,442 A | 11/2000 | Lofts |
| 6,394,020 B1 | 5/2002 | Belyeu |
| 8,869,724 B2 * | 10/2014 | von der Goltz ................ 114/66 |
| 2003/0164132 A1 | 9/2003 | Wippermann |
| 2005/0109254 A1 | 5/2005 | Luong |

FOREIGN PATENT DOCUMENTS

| | | |
|---|---|---|
| JP | 62214092 A | 9/1987 |
| KR | 1020080076864 A | 8/2008 |
| KR | 1020120080780 A | 7/2012 |
| WO | 2014003216 A1 | 1/2014 |

OTHER PUBLICATIONS

"Ego Compact Semi Submarine: Innovation", www.egosubmarine.com/03innovation.htm, Jun. 9, 2014.

"Ego Compact Semi Submarine: Overview", www.egosubmarine.com/01ego_se_overview.htm, Jun. 9, 2014.

Ecofriend, "Reef Explorer: Solar-electric marine craft for marine life exploration", www.ecofriend.com, Dec. 31, 20012.

Patent Cooperation Treaty, "International Search Report and Written Opinion for PCT/US2013/020437", Mar. 1, 2013.

Relaxnews, "New underwater hotel lets guests sleep with Nemo", http://sg.news.yahoo.com/underwater-hotel-lets-guests-sleep-nemo-142126488.html; Nov. 18, 2013.

"Glass bottom boat Looker 350—Paritetboat", http://www.paritetboat.com/glass_bottom_boat_looker_35.htm, Sep. 3, 2008.

"European Search Report, EP13733858.8", Nov. 17, 2015.

"EPO Comments", EP Application No. 13733858.8, mailed Sep. 9, 2016.

* cited by examiner

SYSTEM AND METHOD FOR UNDERWATER OBSERVATION

PRIOR APPLICATION

This application is a Continuation of and claims priority to U.S. patent application Ser. No. 13/735,001, filed Jan. 6, 2013, by H. J. von der Goltz, entitled "System and Method for Underwater Observation," which claims the benefit of priority to U.S. Provisional Application No. 61/583,344, filed Jan. 5, 2012, by H. J. von der Goltz, entitled "Semi-Submersible Observation Watercraft." The contents of each of the foregoing are hereby incorporated by reference into this application as if set forth herein in full.

FIELD OF THE DISCLOSURE

The subject disclosure relates to a system and method for underwater observation.

BACKGROUND

Many of the world's underwater habitats, such as coral reefs, are enjoyed by those willing to expose themselves to the risks and rigors of scuba diving or snorkeling. For those who choose scuba diving there is also a substantial investment in equipment and training for certification and re-certification. Others who are unwilling or unable to partake in such activities may choose to enjoy such aquatic environments in a much more limited fashion, for example, artificially by way of aquariums and vicariously through televised programming or movies.

More recently, excursions have become available at some of the more popular tourist destinations providing patrons with a first-hand underwater experience, without the need for scuba or snorkeling. Such examples include glass bottom boats that essentially provide one or more windows along a bottom portion of a hull allowing deck-side passengers to peer down, into the water without the disturbance or glare otherwise present at the water's surface. Unfortunately, the view is substantially limited by the downward perspective and size of the window(s).

Other, excursions provide an underwater vantage point by way of a hull having windows along side walls. Passengers are able to descend into an enclosed cabin in the hull and peer through the side-facing windows into the surrounding sea at eye level. Unfortunately, such windows are relatively small, flat and supported between substantial frames and other obstructed regions of the hull. Still other excursions provide fully submersible experience, in which passengers enter a submarine watercraft that can be fully sealed from an external environment and descend beneath the surface. Unfortunately, such vessels tend to be much more limited in the viewing of the surroundings scenery, as well as very costly and complex. Moreover, for many passengers, such fully enclosed submarine vessels offer an unpleasant and claustrophobic experience.

BRIEF DESCRIPTION OF THE DRAWINGS

Reference will now be made to the accompanying drawings, which are not necessarily drawn to scale, and wherein.

DETAILED DESCRIPTION

Figure 1A:
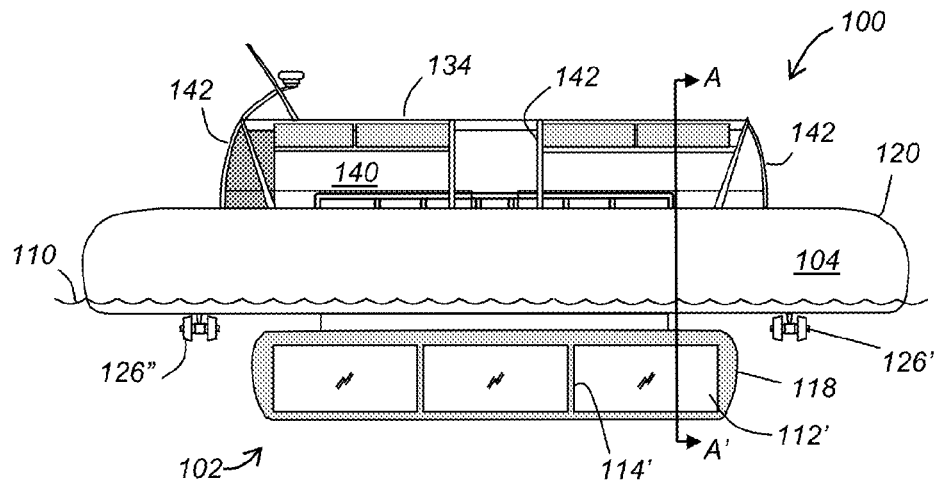
FIGS. 1A-1C are, respectively, a side elevation view, a front view and a transverse cross-section view of an embodiment of a semi-submersible watercraft.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

The subject disclosure describes, among other things, illustrative embodiments of a water vehicle including a deck portion supported above the waterline by a hull and a gondola portion extending below the waterline and accessible from the deck. The waterline defines a boundary between air and a body of water, such as a lake, a river, or an ocean. The gondola portion has one or more transparent walls, a transparent floor and a substantially open top to allow a group of passengers to observe, without obstruction, an underwater environment from a vantage point that is below the waterline, without being completely enclosed from the open-air above the waterline. In some embodiments, each passenger of a group of passengers positioned below a surface of a body of water being explored has unobstructed access immediately overhead to an open-atmosphere. Other embodiments are included in the subject disclosure.

One embodiment of the subject disclosure includes a water vehicle having a deck that is sufficiently sized to accommodate a group of passengers. The water vehicle also includes a hull arranged to support a portion of the deck above a waterline, and an observation gondola extending below the waterline. The observation gondola is secured relative to the deck when configured in an underwater observation mode. The observation gondola includes a transparent floor and a top portion including an open area above the transparent floor. The gondola also includes a number of transparent walls, wherein each wall extends between the floor and the top portion. The floor, the top portion and the walls collectively define an interior region sufficiently sized to accommodate the group of passengers below the waterline.

Another embodiment of the subject disclosure includes a process including supporting a group of passengers upon a deck of a first water vehicle, wherein the deck is above a waterline. The process also includes supporting the group of passengers within a gondola during underwater observation. The gondola defines an interior region sized to accommodate the group of passengers and has a top portal defining an open area. The top portal is positioned above a transparent floor of the gondola. The group of passengers, when situated within the interior region of the gondola, is below the waterline during the underwater observation. An unobstructed transfer of the group of passengers between the deck and the interior region of the gondola is accommodated by way of the top portal, e.g., by way of a stairway between the deck and the interior region of the gondola. The interior region of the gondola is exposed to open-air by way of the top portal during the underwater observation, wherein the open area overlaps at least 50% of the transparent floor.

Yet another embodiment of the subject disclosure includes a system having a first hull and a second hull. The second hull is substantially parallel to the first hull and spaced apart from the first hull. The system also includes a deck supported upon a top surface of a bridge coupled to the first hull and to the second hull. The deck is located above a waterline. A gondola is secured with respect to the deck when configured for underwater observation. An interior region of the gondola extends below the waterline to accommodate a group of adult human passengers below the waterline allowing them to observe an underwater environment. The gondola includes a transparent floor and a top portion positioned above the transparent floor. The top portion includes a portal defining an open area overlapping at least 50% of the transparent floor, and a number of transparent walls extending between the transparent floor and the top portion.

Passengers are able to enter and exit the observation gondola, for example, through a portal provided along a top portion of the observation gondola, by way of a stairway, ladder or elevator, even while other passengers are enjoying observation of the underwater environment from a vantage point that is entirely below the waterline. The observation gondola keeps the passengers dry and comfortable, while the substantially open top portion relieves passengers from an otherwise closed in or claustrophobic experience of a traditional submarine vehicle. The open top portion can be exposed to open-air, e.g., an open atmosphere, that may include a cover having open sides.

In the following detailed description, reference is made to accompanying drawings, which form a part thereof, and within which are shown by way of illustration, specific embodiments, by which the invention may be practiced. It is to be understood that other embodiments may be utilized and structural changes may be made without departing from the scope of the invention.

The particulars shown herein are by way of example and for purposes of illustrative discussion of the embodiments of the present invention only and are presented to provide what is believed to be the most useful and readily understood description of the simple principles and conceptual aspects of the present invention. In this regard, no attempt is made to show structural details of the present invention in more detail than is necessary for the fundamental understanding of the present invention. The description taken from the drawings make apparent to those skilled in understanding how several forms of the present invention may be embodied in practice. Further, like reference numbers and designations in the various drawings indicate similar concepts for the different embodiments.

Figure 1B:
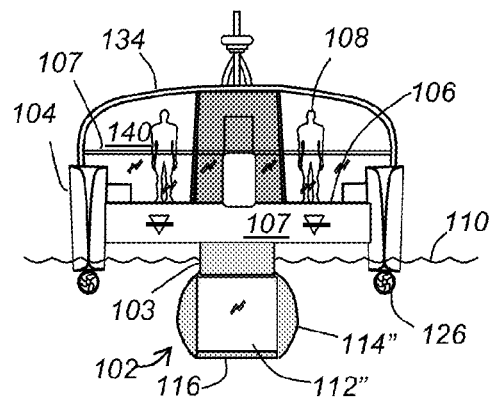
Figure 1C:
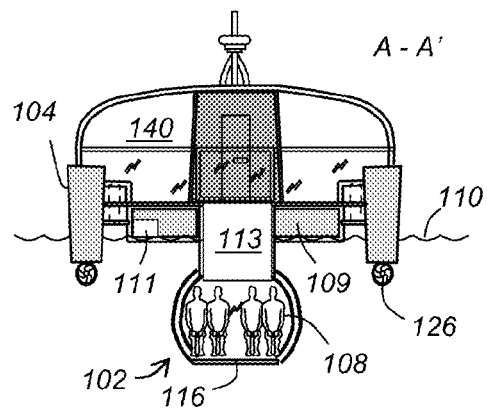

Referring collectively to FIGS. 1A-1C, an embodiment of a water vehicle, or vessel (100) is illustrated having a substantially transparent underwater observation gondola (102). Such vessels (100) are referred to herein as a semi-submersible observation watercraft. The vessel (100) includes at least one hull section (104) supporting a deck (106) sized and positioned to hold a group of passengers (108) above a waterline (110).

By way of example, an indication of the vessel's draft while in observation mode is identified in FIG. 1C. As illustrated, the observation gondola (102) is positioned sufficiently below the waterline to allow for unobstructed view of a seated adult human passenger (108). In some embodiments, a top portion of the observation gondola (102) abuts a bottom surface of a deck supporting structure (107). In other embodiments, the top portion of the observation gondola (102) is spaced apart from the bottom surface of the deck supporting structure (107), such that the observation gondola (102) is positioned deeper below the waterline (110). A collar (103) can be provided between the top portion of the observation gondola (102) and the bottom surface of the deck supporting structure (107), to maintain open access to an interior region of the observation gondola (102) from a deck (106), while keeping water out of the observation gondola (102). A depth of the collar (113), or separation from a top portion of the observation gondola (102) and the bottom surface of the deck supporting structure (107) can be selected to establish a panoramic view that is substantially unobstructed by one or more of hull portions (104) and motors (126', 126").

In order to enhance viewing, the observation gondola (102) includes one or more viewing portions (112) (e.g., walls) formed from an optically transparent material. It should be understood that optically transparent as used herein includes clear material, as well as materials with one or more tints, optical coatings, such as anti-glare coatings, and index matched materials as may be beneficial in enhancing a viewing experience of passengers from within the observation gondola (102).

The viewing portions (112', 112", generally 112) can be joined together along one or more seams that can be welded or reinforced, for example, by way of one or more frame members (114', 114", generally 114). The frame members (114), when provided, can be formed from one or more structural materials, such as steel, aluminum, plastics, wood, acrylics, polymers, polycarbonate, glass, tempered glass, and composites, for example, to be used to accommodate mounting of various devices, such as lights for night viewing, etc. Alternatively or in addition, one or more of the viewing portions (112) can be shaped or otherwise contoured. In some embodiments, the contour of the viewing portions (112) follows the contour of at least a segment of the observation gondola (102). In some embodiments, substantially the entire vertical wall portion (112) of the observation gondola (102) can be formed of various optically transparent materials. Alternatively or in addition, substantially the entire observation gondola (202), including a bottom or floor (216), can be formed of such transparent materials as shown in the water vehicle (200) FIG. 2. Contoured portions, such as walls (212) and a floor (216) can be joined together along seams with the aid of frame elements (114, FIG. 1), or formed in a seamless manner, for example, by molding, casting, welding or otherwise shaping the optically transparent material during fabrication of the observation gondola (102), (202).

One or more of the wall portions (112) and the floor (116) of the observation gondola (102) can include multiple facets arranged to provide substantially undistorted viewing of subsurface terrains. In at least some embodiments, one or more regions of the observation gondola (102, 202) include curved surfaces, as illustrated. Such curved surfaces can be arranged to promote viewing of underwater environments, for example, by minimizing distortion in any of a number of preferred viewing angles (e.g., forward, lateral, aft, downward) or increasing the structural strength. In at least some embodiments, one or more of such curved regions can be convex, or bulbous, as illustrated.

A leading end (118, 218) of the observation gondola (102, 202), e.g., bow-facing portion (118, 218) of the water vehicle (100, 200), can include shaped features, such as, assuming a conventional pointed bow. In some embodiments, the bow-facing portion (118, 218) does not form a point, but rather assumes a curved (e.g., semicircular) profile. Alternatively or in addition, at least a portion of the bow-facing portion (118, 218) can include a substantially flat surface, for example, arranged at a slope with respect to the water surface, providing occupants with a downward tilted viewing window, or a concave surface.

Figure 3A:
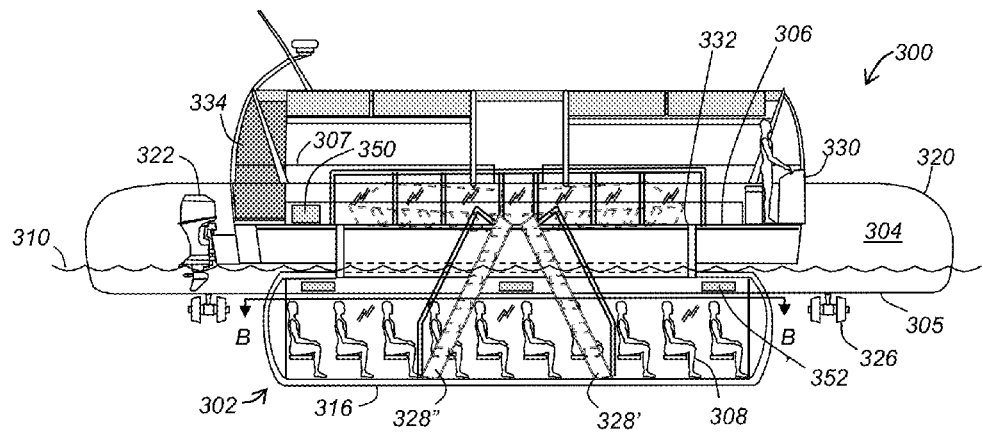
FIG. 3A is a longitudinal elevation cross-section view of the embodiment of the semi-submersible watercraft illustrated in FIGS. 1A-1C.

Referring next to FIG. 3A, a cross-sectional side elevation view is provided for a semi-submersible observation watercraft (300), such as the watercraft (100) illustrated in FIG. 1. In this example, a deck (306) is located above the waterline (310). One or more stairways or ladders (328', 328", generally 328) extend from the deck (306) to a floor (316) of the observation gondola (302). The stairways (328) allow passenger access between the deck (306) and the observation gondola (302). In at least some embodiments, the one or more stairways or ladders (328) can be retractable or otherwise stowed during observation to allow for unobstructed panoramic viewing from within the observation gondola (302). In the illustrative embodiment, the stairways (328) pivot up to a vertical position when stowed, as illustrated. Other stairways (328) can also include a spiral stairway.

In the illustrative example, the water vehicle (300) includes a helm (330) located along a forward portion of the deck (306), for example, overlooking a bow (320). The water vehicle (300) can include other features, such as a head or toilet (334), for example, located along an aft portion of the deck. The toilet (334) can include a chemical toilet. Other features include seating for passengers, and or crew, storage areas, anchoring mechanisms, and any other feature that may be found on a water vehicle.

A captain, or skipper can pilot the water craft (300) from the helm during periods of transport and/or during periods of observation. It is understood that a supplemental piloting system, such as a second helm, or portable control, e.g., from a tablet computer, can be provided to allow for piloting of the water craft, during periods of observation. In some embodiments, a GPS programmable piloting system will be installed. Thus, a tour guide or naturalist might pilot the water craft (300) from within the gondola (302) during periods of observation of an underwater environment, such as a coral reef. The tour guide is thus able to control movement of the watercraft (300) even while using a GPS system. For example, one can depart from a preprogrammed path, to allow for improvisation during a tour. Such improvisation controllable from within the observation cabin allows a tour to be adapted to the current or developing situation of the to-be-viewed underwater environment. An example might be allowing for movement or deviation from the designated route of the water craft (300) for better observation of marine life, such as reef sharks and/or sea turtles that might be nearby. Cameras installed, for example along the bow and the stern of the watercraft (300) allow a pilot, e.g., the skipper, to observe vessel surroundings (above surface, subsurface, or both) on a screen, whether in the gondola (302) or on the deck (306).

In some embodiments, the deck (306) includes a portal (332) defining an open area providing access to the observation gondola (302). In other embodiments, at least a portion of the deck (306) is adjacent to a portal of the observation gondola (302). Areas of the deck (306) surrounding the portal (332) are substantially open so as not to otherwise cover the observation gondola (302) below. Being open in this manner allows passenger access to fresh air during periods of underwater observation, thereby avoiding any sensation of being closed in. Such open construction also simplifies vessel construction. Forward and aft decks can be connected by one or more side deck portions extending between the forward and aft decks, provided that such side deck portions do not substantially obstruct open access to the observation gondola (302).

Figure 4A:
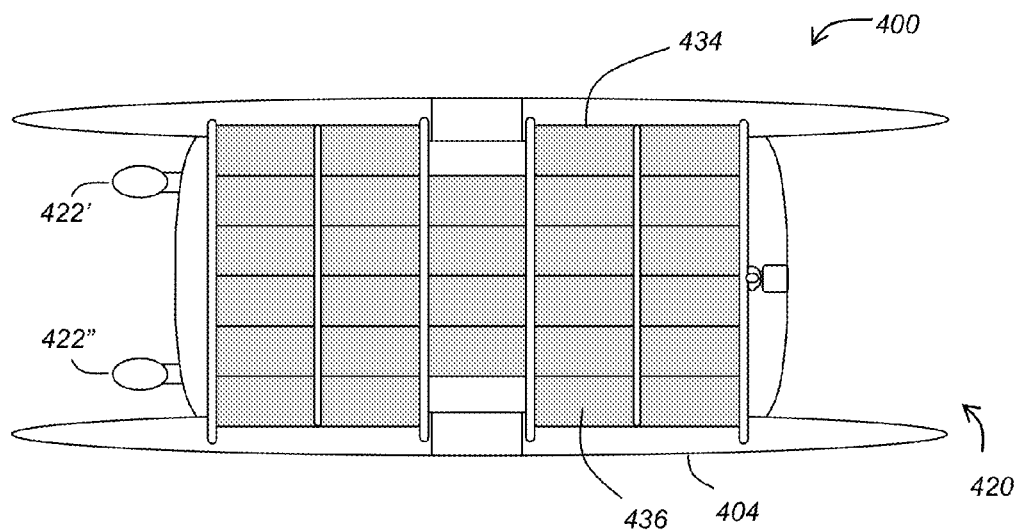
FIG. 4A is a top view of an embodiment of a semi-submersible watercraft.
Figure 4B:
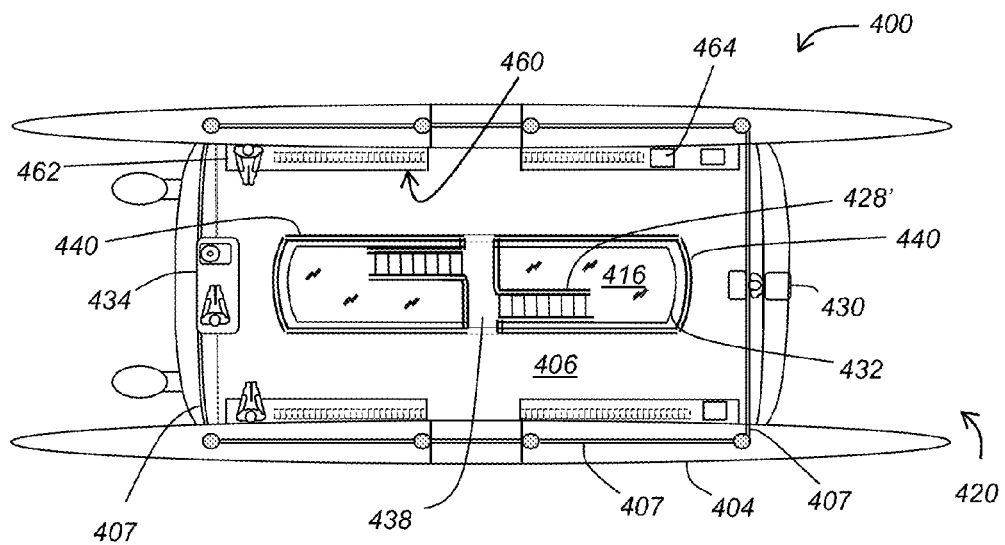
FIG. 4B is a top cut-away view of the semi-submersible watercraft illustrated in FIG. 4A with the roof portion removed.

Referring next to FIG. 4B, an embodiment of a water vehicle (400) is illustrated with a roof portion (434, FIG. 4A) removed to allow for better viewing of the deck (406). The deck (406) is situated above a waterline and defines an aperture or portal (432) providing an opening to an interior region of an observation gondola. A substantially transparent floor (416) of the observation gondola can be observed from a deck-side vantage point by way of the portal (432), as illustrated. In some embodiments, the portal (432) is aligned substantially above the floor (416), such that no portion of the floor (416) is covered by any portion of the deck (406). Alternatively, at least some portions of the floor (416) can be covered by one or more portions of the deck (406), leaving a substantial portion of the floor (416) uncovered by any portions of the deck (406). An interior region of the gondola (402) is bounded by the floor (416), wall sections, and a top portion. The top portion defines a portal providing open-air access to the interior region of the gondola (402) during observational modes of operation, while the interior region is below the waterline. As a matter of design choice, an open area defined by the portal can be less than an area of the floor (416), e.g., exposing 50% of the floor (416), substantially equivalent to the area of the floor (416) or greater than the area of the floor (416), in either of the latter two instances exposing 100% of the floor (416). In some embodiments, the top portion includes top portions of each of the wall sections, such that the portal is defined by the top portions of the wall sections.

In the illustrative example, and without limitation, a bridge (438) is formed by a portion of the deck (406) extending across a portion, e.g., a mid-section, of the portal (432). The stairways (428) extend from the bridge (438) portion of the deck (406) to the floor (416) of the observation gondola to allow for passenger access therebetween. A railing, wall and/or balustrade (440) can be provided around a perimeter of the portal (432) for safety, to prevent passengers from unintentionally falling into the open interior region of the observation gondola from the deck (406) through the portal (432).

A retractable hatch cover can be provided to seal the portal (432), for example, during periods of rough seas and storage of the vessel to prevent the open interior of the observation gondola from being swamped. Preferably, such retractable hatch cover should not interfere with the openness of the portal (432) during observational periods, and in some instances, can be removed altogether.

Figure 3B:
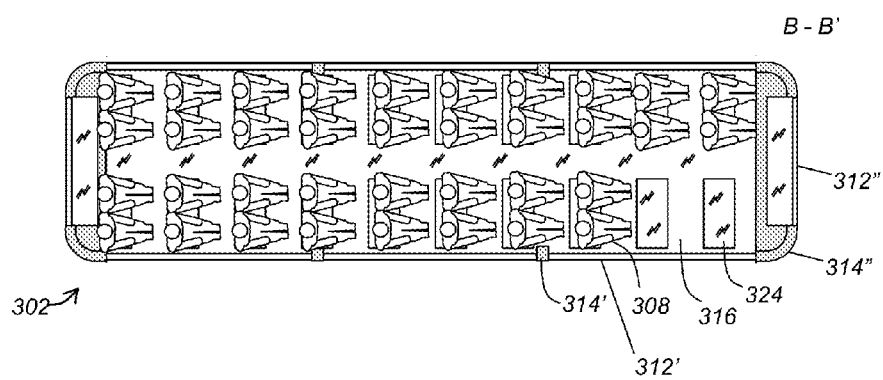
FIG. 3B is a planar cross-section view of an observation gondola of the semi-submersible watercraft illustrated in FIG. 3A.

The observation gondola contains seating. In at least some embodiments, seating is optically transparent and sufficient to accommodate a predetermined number of passengers, e.g., 10 adult passengers, 20, 40 or more. Any suitable seating arrangement can be provided. The seating can be attached to one or more of a wall and a floor of the observation gondola. With reference to FIGS. 3A-3B, one such arrangement is a bench-style seat (324) located above the floor of the observation gondola (302). Passengers (308) seated on the bench seats (324) are able to view the surrounding waterscape, unobstructed (e.g., in full 360-degree around the wall portions (312', 312") of the gondola). In the illustrative example, twenty such bench seats for two people are included within the observation gondola (302), with each bench seat (324) accommodating one or more passengers. As shown, each of the bench seats (324) is sized to accommodate two persons (308) for a total occupancy of 40 passengers (308).

As illustrated, the bench seats are configured such that occupants are facing forward. Other arrangements are possible in which the passengers (308) can be facing aft, side, or some combination of forward, aft and to one or more sides. It is important to appreciate that the passengers (308), at least while seated, are positioned below the waterline (310) as shown. It is also important to appreciate that the passengers (308) are also below the bottom surface (305) of each of the hulls (304).

In at least some embodiments, the water vehicle also includes a roof (134, FIG. 1A-1C) or suitable cover. The roof (134) can be rigid, as in fiberglass, metal, e.g., aluminum, or wood, or the roof (134) can be flexible, as in a canvas, vinyl, or tarpaulin. The roof (134) can be retractable, to allow exposure of varying areas of the deck (106). In some embodiments, the roof can be entirely removable and replaceable. The roof (134) can be supported by suitable frame (142) supports or struts attached to one or more of the deck (106) and the hull (104). Beneficially, the roof (134) overlaps the open top portion of the observation gondola (102) to reduce glare and thereby promote underwater viewing. The roof (134) also protects passengers (108) from exposure to the elements (e.g., sun, rain), whether they are in the observation gondola (102) or on the deck (106). The roof (134) may cover the entire deck (106), or leave one or more portions of the deck (106) exposed. As shown, the roof (134) can be suspended above the deck(s) (106) by roof supports (142). Being suspended in this manner, the roof (134) does not seal any open portion of the observation gondola (102). Accordingly, fresh air, and at least some ambient light is allowed into the observation gondola by way of open space (140) between the deck and the roof, either alone or in combination with the usage of one or more fans.

The water vehicle is particularly well suited for cruise ship excursions for which large numbers of cruise ship passengers are taken to a common destination for a relatively brief period of time. It is advantageous to provide an enjoyable excursion experience for durations of an hour, or more, for relatively large groups of cruise ship passengers to expose them to the beauty of coral reefs and the importance of their conservation. It is envisioned that relatively large groups of perhaps twenty, forty or more passengers or more can be accommodated at one time in an observation gondola of each high-occupancy vessel.

In some modes of operation, one or more other water vehicles, such as speedboats, or motor powered inflatable boats, such as Zodiac® inflatable boats, can be used to ferry passengers between an embarkation location, e.g., a pier, or a cruise ship, and the water vehicle located at an offshore destination, such as a coral reef With such an approach, one group of passengers can be enjoying an underwater experience, while another group of passengers is being transported to or from the water vehicle. After dropping off one group of passengers to the water vehicle (100), the speedboat returns to the embarkation point to pick up another group of passengers. Upon returning to the water vehicle (100), the speedboat exchanges one group of passengers for the other, repeating the process throughout the day, as required. Sufficient deck space can be provided by the water vehicle (100) to accommodate all of the passengers in any of the high-occupancy configurations disclosed herein.

Figure 5A:
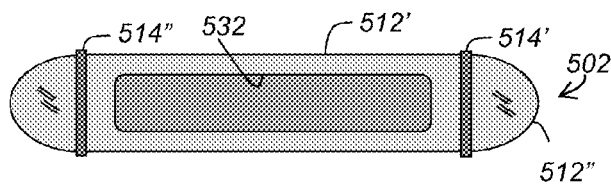
FIGS. 5A-5C are, respectively a top view, side view and transverse cross section of an embodiment of an underwater observation gondola.
Figure 5B:
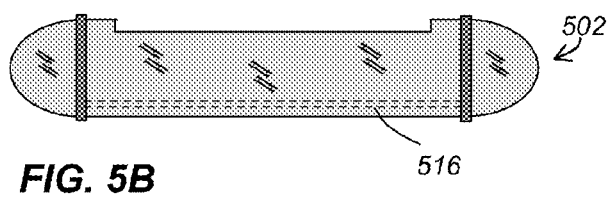
Figure 5C:
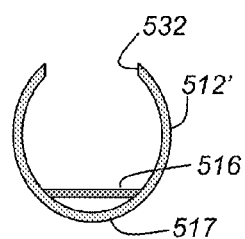

FIGS. 5A-5C, respectively illustrate top, side and lateral cross-section views of an embodiment of an observation gondola (502). The observation gondola (502) includes an optically transparent, substantially tubular wall (512') sealed off by two optically transparent opposing end walls (512"). Frame structures, or spars (514', 514", generally 514) can be provided to facilitate water-tight joining the tubular wall (512') to each of the end sections (512"). Such spars (514) can also serve as points of attachment, e.g., mounting brackets, for securing the observation gondola (502) to a water craft. One or more additional spars (514) can be included to join together additional tubular wall sections (512'), thereby extending an axial length of the observation gondola, which would be beneficial for accommodating other equipment, such as cameras, sensors, e.g., sonar sensors, bumpers, and lights for night viewing. The gondola (502) provides an unobstructed panoramic and downward views of the underwater environment.

As used herein, reference to unobstructed can include a range from completely unobstructed to minimally or slightly obstructions. Such minimal obstructions can be provided, for example, by relatively thin frames, spars, mounting brackets, seams, ancillary equipment, such as sonar cameras, and the like. Thus, unobstructed can range from 100% unobstructed view, to something slightly less, for example, to 99%, to 95%, or perhaps to 90% unobstructed.

The tubular wall (512') also defines an opening (532) along a top portion for alignment with an open area of the deck, e.g., portal, as disclosed herein. The tubular wall (512') can have a circular cross-sectional shape, as shown, or any other suitable shape, such as an oval, an egg shape, a polygon, or combinations of such shapes. A flat floor (516) can be provided, for example, being slid into the tubular wall (512') before sealed by the opposing end walls (512"). The floor can be secured by chemical, thermal and/or mechanical means, including one or more of chemical bonding agents, welds, and the like.

Figure 6A:
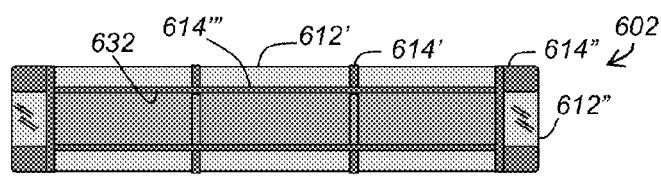
FIGS. 6A-6C are, respectively a top view, side view and transverse cross section of another embodiment of an underwater observation gondola.
Figure 6B:
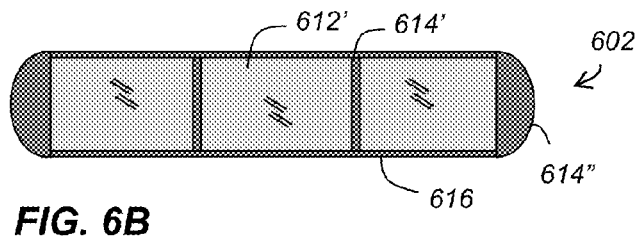
Figure 6C:
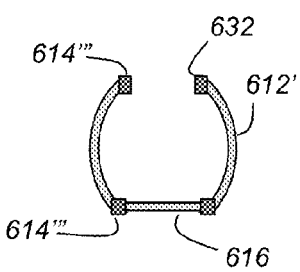

FIGS. 6A-6C, respectively illustrate top, side and lateral cross-section views of another embodiment of an observation gondola (602). The observation gondola (602) includes optically transparent, side wall sections (612') bounded by two optically transparent opposing end walls (612") and an optically transparent floor (616). Frame structures, or spars (614', 614", generally 614) can be provided to facilitate water-tight joining the side wall sections (612') to each other and to each of the end sections (612"). Other longitudinal spars (614") can be provided between the side wall sections (612)' and the floor (616), and/or along an open edge of a top aperture (632). Such spars (614) can also serve as mounting bracket, e.g., for points of attachment securing the observation gondola (602) to a water vehicle, and/or as support structures for the placement of other equipment, such as illuminating lights, cameras, sensors, bumpers, and the like.

A portal (632) is formed along a top portion of the observation gondola (602) for alignment with an open area of the deck of the water vehicle as disclosed herein. The lateral wall sections (612') can have a curved cross-sectional shape, as shown, or any other suitable shape, such as flat, angled, or combinations of such shapes.

Figure 7A:
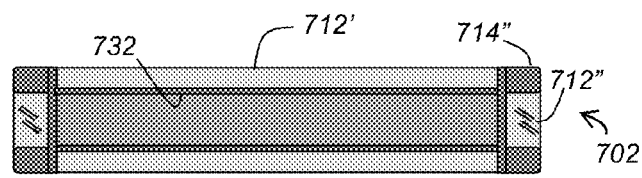
FIGS. 7A-7C are, respectively a top view, side view and transverse cross section of yet another embodiment of an underwater observation gondola.
Figure 7B:
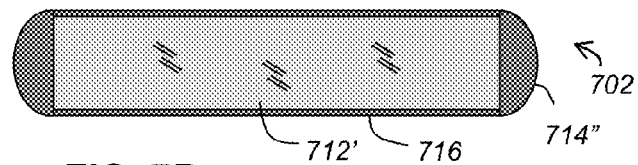
Figure 7C:
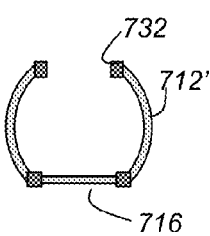

FIGS. 7A-7C, respectively illustrate top, side and lateral cross-section views of yet another embodiment of an observation gondola (502), similar to the embodiment illustrated in FIGS. 6A-6C, with a single lateral wall (612') along each side of the observation gondola. Such extended length lateral walls (612') promote unobstructed viewing of the underwater environment.

Optically transparent materials suitable for use within the observation gondola (102) can include one or more of glass, tempered glass, ceramics, crystals, polymers, acrylics, polycarbonate and composite materials formed from combination of one or more different materials, such as those identified above. One or more of the optically transparent materials can be treated with scratch resistant coatings. When used for one or more of flooring, seating, or stairs, such optically transparent materials can be modified to increase friction relative to a polished surface. Such modifications can include texturing, such as scoring, molding, roughening, e.g., frosted, and the like.

In some embodiments, a water vehicle includes a self-contained lighting system. The lighting system can include deck-side lighting for illumination of the deck and seating areas above the waterline as may be required during overcast conditions or early morning, late evening and nighttime operations. The lighting system can also include lighting for an observation gondola, for example, to illuminate passageways, and/or seating areas in a minimally invasive manner so as not to interfere with observation of the underwater environment. Such lighting can include runway-style lighting.

Figure 8A:
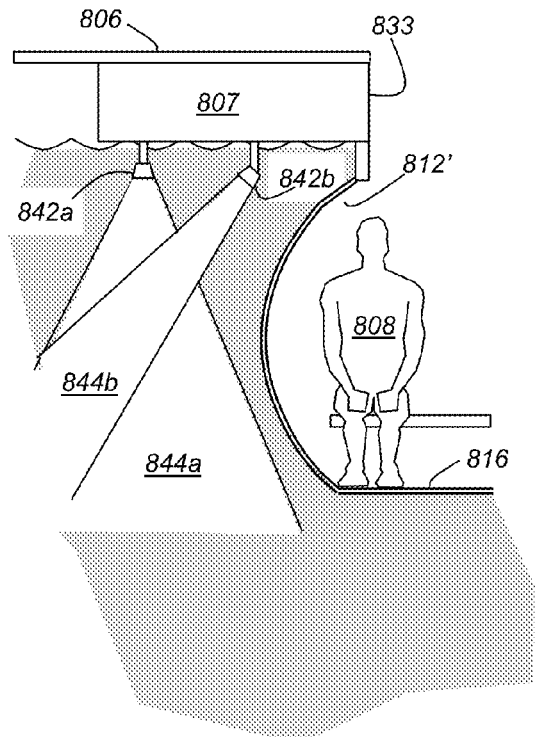
FIG. 8A is a partial transverse cross section of an embodiment of a lighting configuration of a semi-submersible watercraft.

Alternatively or in addition, the water vehicle can include an external, subsurface lighting system. An embodiment of one such system is illustrated in the partial cross section of FIG. 8A. Here, one or more axially aligned rows of lights extend along an underside of a bridge structure (807) supporting a deck (806). A first row of lighting elements (842a) is arranged to illuminate a preferred direction (844a). In the illustrative example, the first row of lighting elements (842a) provides a flood illumination (844a) facing substantially downward. A second row of light elements (842b) is arranged to illuminate another forward, backward or lateral preferred direction (844b). In the illustrative example, the second row of lighting elements (842b) provides a relative narrow beam (844b) along a preferred direction, down and away from the lateral wall (812'). Other lighting configurations are possible, including additional rows of lighting elements, and/or one or more controllable, moveable and directional spot lights.

Figure 8B:
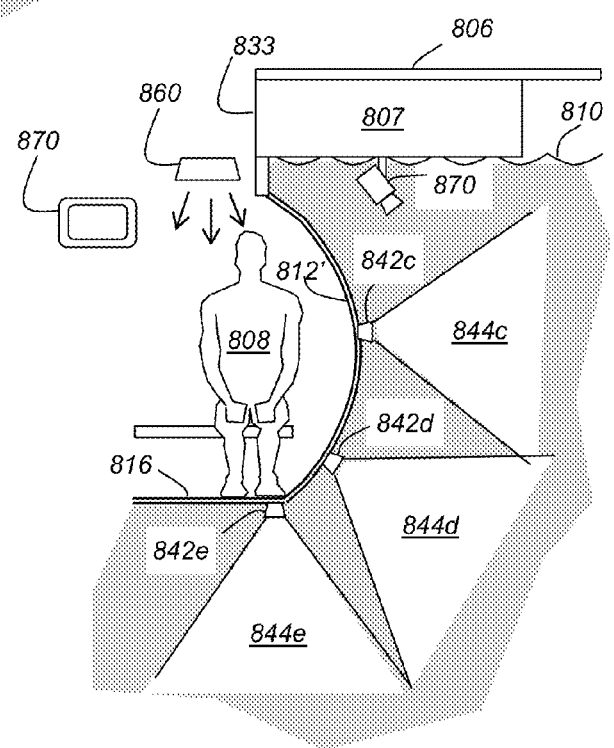
FIG. 8B is a partial transverse cross section of another embodiment of a lighting configuration of a semi-submersible watercraft.

Another embodiment of a lighting system is illustrated in the partial cross section of FIG. 8B. Here, one or more lights are positioned along one or more of a lateral wall (812') and a floor (816), for example, being mounted in a conduit, or spar (814). A first lighting element (842c) is arranged to illuminate a preferred direction (844c). In the illustrative example, the first lighting element (842c) provides illumination (844a) facing substantially laterally from the observation gondola (802). Additional light elements (842d) are arranged to illuminate another preferred direction (844d). In the illustrative example, a second lighting element (842d) illuminates along a preferred direction, down and away from the lateral wall (812'). A third light element (842e) is directed to illuminate another preferred direction (844e). In the illustrative example, the third lighting element (842e) illuminates a preferred direction, down from the floor (816). The arrangement of illumination elements (842c, 842d, 842e) can be repeated on one or more spars or frame sections along an axial length of the observation gondola as may be required.

In at least some embodiments, the different lighting elements can be turned on independently, in groups, or collectively to preferentially illuminate the underwater environment. Other lighting configurations are possible, including additional rows of lighting elements, and/or one or more controllable spot lights (not shown) and combinations of one or more of the lighting elements (842a, 842b) of FIG. 8A with the lighting elements (842c, 842d, 842e) of FIG. 8B.

The partial cross section illustrated in FIG. 8B, includes an environmental control element (860). The environmental control element (860) can be positioned at any convenient location within or above the open interior region of the observation gondola so as not to interfere with observation of the underwater environment. The environmental control element (860) can include any of the environmental elements disclosed herein and equivalents thereto or otherwise known. Some examples of environmental control elements (860), and without limitation, include fans, evaporative coolers, air conditioners, heaters.

Also shown in the partial cross section illustrated in FIG. 8B is a display device (870). One or more such display devices (870) can be positioned within the water vehicle to allow for passenger instruction and entertainment. For example, display devices (870) can display documentary content regarding preservation of coral reefs, or video captured from the current or previous excursions, for example, views of a particular species of fish or other interesting scene during the excursion. Display devices (870) provided above deck (not shown) can display similar content, or content captured during a current excursion to allow deck-side passengers to enjoy the underwater environment while above deck.

To support image capture, the water vehicle can include one or more cameras (870), such as still cameras and/or video cameras. The cameras (870) can be positioned at one or more locations below a waterline (810) and controlled by one or more of a tour guide and the passengers to selectively capture scenes from a current excursion. Videos can be produced and distributed, e.g., sold, to passengers for souvenirs as a remembrance of their excursion.

In some embodiments, the water vehicle is equipped only with an independent, relatively low-powered electric propulsion system, e.g., one or more 10 horsepower motors, such as the four electric motors (126) shown in FIG. 1. In such embodiments, transportation of the water vehicle, for example, to and from observation destinations, can be accomplished by the aid of a separate propulsion source. Such propulsion sources may include one or more other powered vessels, such as motor boats, motor-powered inflatable boats, e.g., Zodiac® inflatable boats, barges, jet skis, and the like. In some embodiments, the water vehicle is self-powered, having its own transport propulsion system. For example, the water vehicle can contain one or more outboard motors, as illustrated, inboard motors, inboard-outboard motors, sails, oars, and the like, either alone or in combination. Particularly for those embodiments in which the water vehicle is self-propelled, the water vehicle can be optionally equipped with at least one rudder (not shown) for steering and a helm from which the vessel can be operated.

In an illustrative example, a water vehicle (300) includes one or more stern-mounted outboard motors (322), as shown in the longitudinal cross section of FIG. 3A. Such motors can provide sufficient thrust to propel the vessel at least up to, and in some instances, exceeding the vessel's hull speed. Such motors can be used to rapidly transport the vessel between boarding and destination locations and/or between multiple destination locations.

Figure 9A:
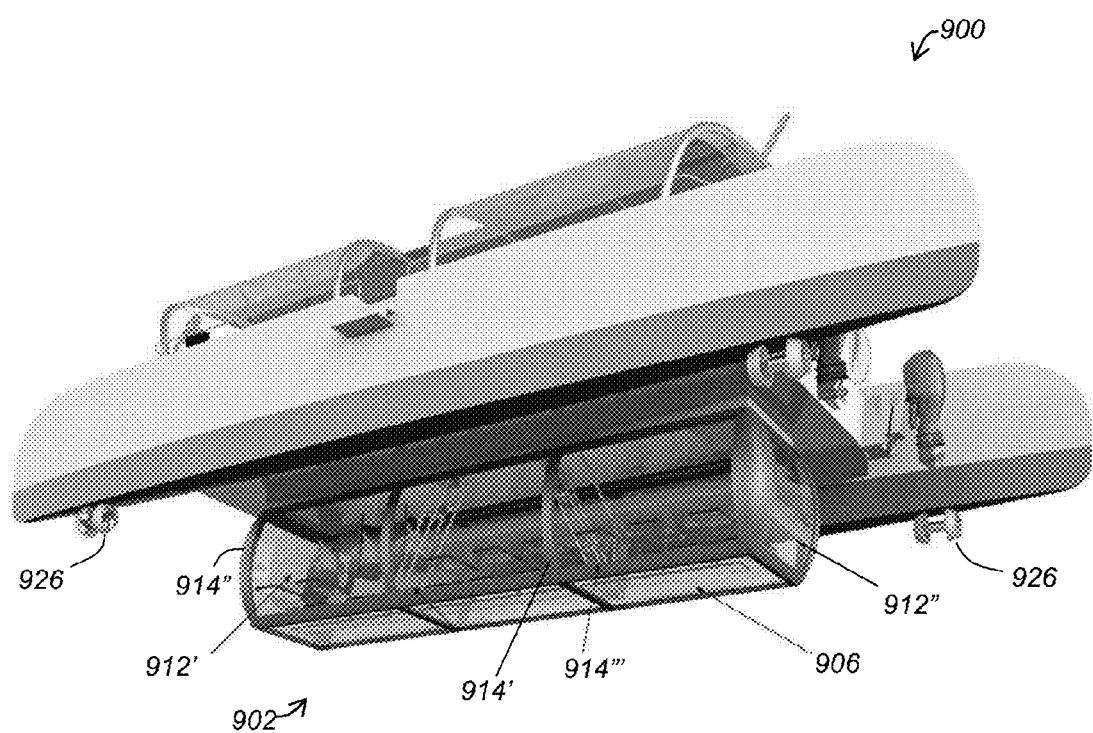
FIG. 9A is a bottom rear perspective view of an embodiment of a semi-submersible watercraft.

A rear perspective view of an embodiment of a water vehicle (900) is provided in FIG. 9A from a sub-surface vantage point. The observation gondola (902) includes three optically transparent lateral wall sections (912') on each side of the gondola (902). The observation gondola (902) also includes three optically transparent floor sections (916) and two opposing optically transparent end wall sections (912"). A network of spars (914', 914", 914''') provide as means for connecting other equipment, such as lighting equipment, and as a means for securing the observation gondola (902) to an upper portion of the water vehicle (900).

Figure 9B:
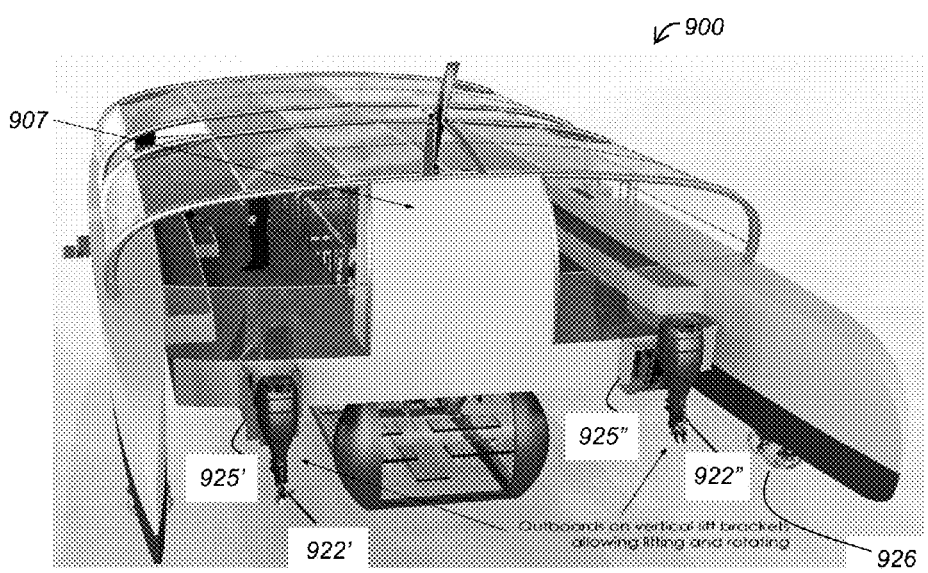
FIG. 9B is a top rear perspective view of the embodiment of a semi-submersible watercraft illustrated in FIG. 9A.

A rear perspective view of the water vehicle (900) is provided in FIG. 9B from an above-surface vantage point. The water vehicle (900) includes two outboard engines (922', 922", generally 922). Each of the outboard engines (922) is mounted to an aft edge of a bridge structure (907) by way of a respective vertical lift bracket (925', 925", generally 925). The vertical lift brackets allow the outboard engines (922) to be lowered into the water during periods of transport and raised substantially above the waterline during periods of observation. Thus, the outboard engines (922), when present, do not interfere with panoramic viewing of the underwater environment from within the gondola (902). Also viewable are electric propulsion motors (926).

In some embodiments, the vessel (100, 200, 300, 900) includes a touring propulsion system including one or more auxiliary propulsion devices, such as electric motors (126, 226, 326, 926) or jets. Such auxiliary motors or jets are not necessarily used during high-speed transportation, but are rather used for transportation and/or positioning of the vehicle (100, 200, 300, 900) during periods of observation (e.g., while at a destination). Accordingly, such auxiliary motors (126, 226, 326, 926) are generally smaller and less powerful than the motors of a transport propulsion system (322, 922) used during high-speed transportation. In particular, such auxiliary electric motors (126, 226, 326, 926) are preferably quiet and electric, using battery power or another source of renewable power, such as solar cells, during operation to avoid disturbing subterranean locations during periods of observation.

At least one class of motors that is particularly well suited for such operations are electric motors. In the illustrative embodiment of FIGS. 1A-1C, forward auxiliary motors (126') and aft auxiliary motors (126") are located along each of the port and starboard sides of the vessel (100). It is anticipated that the four 10 horsepower electric motors shown can consume about 30 kilowatts of electrical power. Positioning of the water vehicle (100) can be accomplished by varying one or more of the speeds and directions for one or more of the auxiliary motors (126). In some embodiments, one or more of the auxiliary motors are rotatable, for example, rotatable about a vertical axis to preferentially direct thrust according to a chosen direction. For such rotatable applications, it is understood that all of the auxiliary motors (126) can be arranged to rotate in unison, or one or more of the auxiliary motors can be arranged to rotate independently from the others.

Alternatively or in addition, one or more of the auxiliary motors (126) are positioned with a fixed direction, e.g., at a rotation of +/−45 degrees about a vertical axis measured from an axis aligned with a longitudinal centerline of the water vehicle (100). Positioning of the water vehicle can be controlled by adjusting power and direction, e.g., forward or reverse, independently to one or more of the auxiliary motors (126). An onboard computer control can be provided to allow for a simplified steering in which a single instrument, such as a joystick, can be used to position the water vehicle (100) by adjusting the thrust of the vectored auxiliary motors (126) in a coordinated manner to move the vessel according to position of the joystick.

The one or more auxiliary motors (126, 226, 326) can be positioned below a hull, as illustrated. For such below-hull mountings, it is preferable to position the auxiliary motors as illustrated to be located away from the observation gondola (102, 202, 302) so as to avoid obstruction of a passenger's view. Alternatively, one or more of the auxiliary motors can be positioned along an inner and/or outer side of one or more hull sections (104, 204, 304), so as not to extend substantially below a bottom surface of the hull section (104, 204, 304). In at least some embodiments, the auxiliary motors (126, 226, 326) are located within the hull sections (104, 204, 304) or are retractably mounted to allow for retraction to enhance unobstructed viewing.

Figure 10:
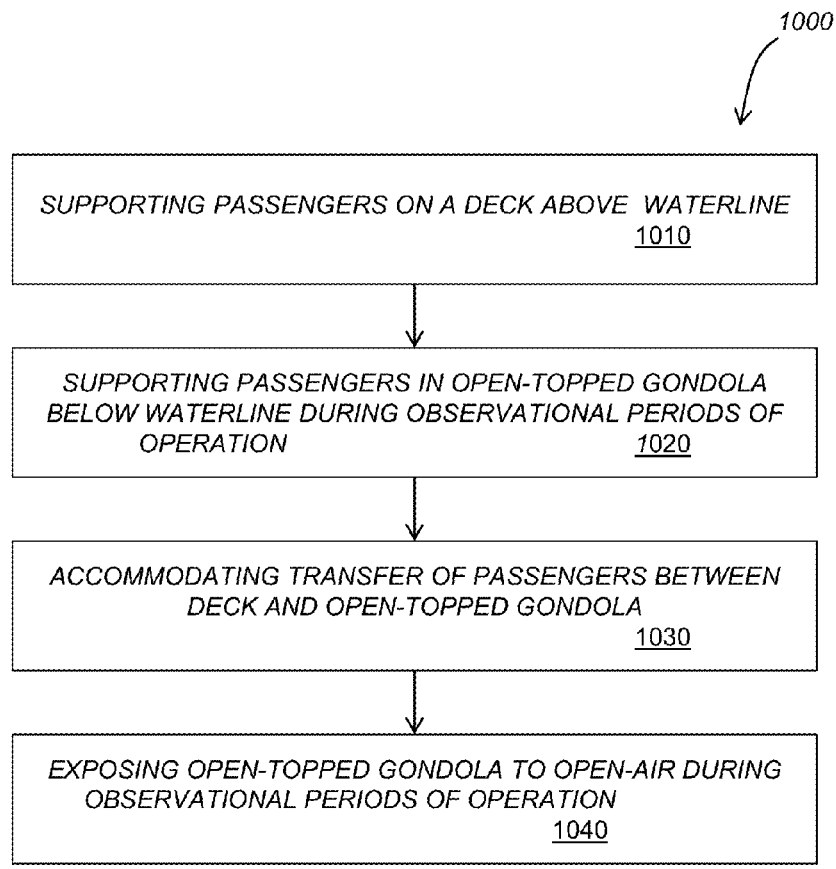
FIG. 10 is a flow diagram of a process to provide underwater observation while maintaining substantial open air access.

A process for operating a watercraft vehicle is disclosed in the flow diagram of FIG. 10. The process (1000) includes supporting a group of passengers on a deck above a waterline at (1010). A group of passengers is supported in an open-topped gondola below the waterline at (1020). Transfer of passengers is accommodated between the deck and the open-topped gondola at (1030). The open-topped gondola is exposed to open-air during observational periods of operation at (1040).

In at least some embodiments, the water vehicle includes a navigation system that allows the vehicle to navigate with reference to one or more externally accessible navigation aids. Preferably, such modes of navigation are available while passengers are observing the underwater environment as disclosed herein. More generally, the semi-submersible observation craft can be equipped with any sort of equipment, systems and devices as might be found on a nautical craft. Some examples include navigation equipment (e.g., GPS, LORAN), sonar, radar, and communications devices, such as marine radios, satellite radios, citizen band radios, and the like. From the helm a skipper can navigate the vessel from a point of embarkation to one or more observation destinations, also providing safe return to the point of embarkation or other such destination.

In at least some embodiments, one or more of the navigation systems, can work in cooperation with a guidance and control system to pilot the water vehicle in a closed loop, e.g., servo, fashion during periods of operation. It is also understood that a preferred path of the water vehicle can be pre-programmed into such a control system to work in cooperation with nautical maps and charts and position information updated by a system, such as GPS. Such modes of operation can work in cooperation with other sensory systems, such as sonar or light detection and ranging (lidar) to avoid interference with local terrain features, such as coral reefs, or other nearby structures. Thus, a sonar system that detects a nearby object within an unacceptable tolerance to a pre-programmed path can result in an adjustment of the pre-programmed path to avoid contact.

With any of the construction approaches described herein, the hull (104, 204) can assume anyone of a number of conventional hull designs. Such hull designs include smooth curved shapes, such as round, semi-round and S-bottom configurations. Other hull designs include chined hulls, such as V-bottom chined hulls, flat-bottom chined hulls, and multi-chined hulls. The chines can be hard, e.g., flat, or soft, e.g., curved, or some combination of soft and hard. In at least some embodiments, the hulls can include one or more appendages, such as a protrusion below the waterline, e.g., a bulbous bow, a keel, and one or more control devices, e.g., a rudder a trim tab, or a stabilizing fin. The hull design can include single, or mono-hull, or a multi-hull, e.g., a multi-hull catamaran, or a multi-hull trimaran. Hulls of multihull vessels can be symmetric, as in two identical hulls of a catamaran, or asymmetric. Two or more hulls of a multi-hulled vessel can be connected by above-water structure, such as a platform or above-water bridge.

The hull portion(s) of any of the embodiments disclosed herein, equivalents thereto, or other generally accepted configurations, can be constructed from any suitable material, such as are commonly used in the construction of boats and ships. Such materials include steel, wood, ceramics, concrete, glass-reinforced resins or plastic, more commonly known as fiber reinforced resins, fiberglass, foams, metals, such as steel and/or aluminum, wood or similar cellulose material, rubbers, both natural and synthetic, and polymer based structural materials. In at least some embodiments, a portion of the hull can include or otherwise be combined with one or more flotation devices, such as pontoons or rafts. Other features to aid in one or more of buoyancy and stabilization can be included. Some examples of such features include outriggers, pontoons, multi-hulls (e.g., a catamaran style as illustrated with the observation gondola situated between two of such multi-hulls), and the like.

It is also understood that in some embodiments, one or more of the observation gondolas and the hull portions of any of the embodiments disclosed herein, equivalents thereto, or other generally accepted water vehicle configurations, can be reinforced with one or more structural members, such as a lengthwise structural member, sometimes referred to as a keel or backbone, and frame members, such as ribs, struts, or the like that may interconnect with the keel. Such structural members can be formed from any suitable material, including wood, metals, polymers, fiber reinforced resins, and the like. Some embodiments, such structural members can be formed from optically transparent material, such as tempered glass, polymers, polycarbonate, acrylics, and the like.

In some embodiments, however, the hull is fashioned from a suitable material that provides sufficient structural stability, or seaworthiness, under all intended modes of operation. A particular design of the observation gondola may include reinforced sections that enhance structural stability, such as thickened and/or folded regions. Such reinforced regions can be localized, for example, by forming one or more integral keels, frames, struts or ribs of the same material used for the lower hull portion. Alternatively or in addition, such reinforced regions can be continuous, for example, having smooth transitions between reinforced regions and non-reinforced regions of the observation gondola.

In the illustrative example of FIG. 5A-5C, a floor (516) is suspended above a bottom portion (517) of the observation gondola (102). Such space between the bottom portion (517) and an underside of the floor (516), sometimes referred to as a bilge, can be used as a space for ballast as may be required to provide stability and/or desired buoyancy. As unwanted bilge water may include contaminants, such as soil and debris, it is advantageous to avoid the buildup of such bilge water under the observation floor (516). One or more pumps can be employed to remove any undesired material from this space. Each of the one or more hull sections (104, 204, 304) can also include one or more of bilge pumps and ballast.

In at least some embodiments, it is advantageous to alter buoyancy of the water vehicle (100), for example, during transportation and observation modes of operation. Namely, during transportation of the water vehicle (100) between a point of embarkation and a destination, or between multiple destinations, greater buoyancy can be provided to reduce the draft, thereby reducing drag along the lower portions of the hull (104). Such reduction in drag, alleviates power required by the motors in moving the vessel, also allowing for greater speeds and providing for improved fuel efficiency.

It is understood that there is at least one static component of buoyancy related to open area of the observation gondola. A static ballast portion can be provided to offset at least a portion of the buoyancy of the observation gondola. Such ballast can be provided using any suitable technique, such as construction materials of one or more portions of the vehicle, e.g., iron or lead weights positioned within one or more of the hull sections and other sections of the water vehicle, including bridge portions joining multi-hull embodiments. In some embodiments, a portion of the static ballast is provided by an array of batteries. In particular, rechargeable, lead-acid batteries provided for the electrical power system can be distributed and otherwise positioned to provide a measured amount of static ballast. In some embodiments, a variable ballast component can be added to allow for variation of a draft of the water vehicle, which can be advantageous during operation.

FIG. 1B illustrates a front view of the water vehicle (100) arranged to provide a reduced draft. With the reduced draft, a bottom surface of a bridge structure (107) coupled between the two hulls (104) of the catamaran is above the waterline. The portion of each hull (104) below the waterline is also minimized With such reduced draft, however, not all of the observation gondola (102) may reside under the waterline (110). Once the water craft (100) has reached an observation destination, such as a coral reef, the water craft (100) can alter its buoyancy, making the vessel less buoyant, such that a greater portion of the hull is submerged (i.e., increased draft). Since the vessel is predominantly stationary or otherwise moving at relatively slow speeds during observations, the additional drag is of little consequence. FIG. 1C illustrates a transverse cross sectional view of the water craft (100) showing the draft increased such that the bottom surface of the bridge structure (107) is at or below the waterline (110). In this configuration, the observation gondola (102) is forced down further below the waterline (110) to promote unobstructed panoramic views of the underwater environment.

Buoyancy can be adjusted by the addition or removal of ballast. At least one method for adding and removing such ballast is by allowing some water into the vessel, as in the hull (104), or the bridge structure (107) to increase ballast and ejecting water from the hull to decrease ballast. Such transfer of water into and out of the vessel can be accomplished using one or more pumps. Water can be allowed to flow into an area of the hull (104) or bridge structure (107), such as a tank (109) provided within the bridge structure (107), below the deck (106) to increase ballast. An access pathway (113) is shown extending between the deck (106) and an open top of the observation gondola (102), with the one or more tanks (109) shown on either side of the access pathway (113).

A pump (111) is configured to preferentially pump water into the tank to increase ballast and pump water out of the tank to decrease ballast. Due to natural pressure differentials, a pump may not be necessary for increasing ballast. Rather, controllable valves can be configured to open and close thereby allowing a desired volume of water to flow into the hull. Once a desired draft has been reached, the valves can be closed, maintaining stable buoyancy (i.e., observation mode). In preparation for transportation, one or more pumps can be operated to pump water out of the ballast storage container(s), thereby reducing ballast and increasing buoyancy. Once a desired transportation mode draft has been reached, the pumps can be turned off, once again, maintaining stable buoyancy (i.e., transportation mode). In at least some embodiments, compressed gas, such as air, can be used alone or in combination with fluid pumps to eject ballast water.

It is understood that in some embodiments, one or more passengers (308) may remain standing. In such configurations, it is understood that the observation gondola (302) allows for standing adult passengers (308) be positioned substantially below the waterline (310). Thus, the draft of such water vehicle to accommodate standing passengers (308) can be greater than water vehicles configured for seated observation, such as the water vehicle (300) of the illustrative embodiment.

It is envisioned that any of the water vehicles disclosed herein, including equivalents, can be used in areas subject to environmental extremes, such as heat or cold. As such, and to maintain a comfortable environment for passengers, the water vehicle (300) can include one or more environmental controllers to otherwise alter the gondola environment. In the illustrative example of FIG. 3A, three climate control elements (350) are shown arranged within the observation gondola (302). Such control elements (350) can include simple fans for circulating gondola air. Other climate control elements (352), such as additional fans, evaporative coolers, heaters and/or air conditioners can be provided, as may be advantageous for any given application. As cold air generally settles to lower portions of an open space, an open top of the observation gondola will not preclude or otherwise render inefficient the use of air conditioning. One or more controllers (352) can be provided, for example, in an equipment cabinet above deck (306), to provide control signals allowing the climate control elements (352) to be controlled from above deck (306).

In order to provide power for electrical devices that may be included, such as the environmental controllers, navigation equipment, propulsion system and the like, the water craft includes a source of electricity. For example, the water craft (400) illustrated in FIGS. 4A-4B includes one or more batteries, such as rechargeable marine grade batteries. An array of batteries (460) is shown stowed below a bench seat (462) provided above the deck (406). Alternatively or in addition, the vessel can include one or more renewable sources of energy, such as solar panels (solar cells), wind turbines, and the like. In the illustrative embodiment, one or more solar cells (436) are mounted above the roof (434). The vessel can also be equipped with power conversion devices (464), such as power inverters suitable for converting DC power (e.g., 5 volts, 12 volts, 24 volts, 28 volts) to AC power (e.g., 117 volts, 220 volts, 50/60 Hz). Power conversion devices can generate power from one or more of the renewable sources of energy, a fuel-powered generator as might be powered by an engine of a transport propulsion system, and utility power mains, as might be available while docked.

In at least some embodiments, one or more electrical systems of the water vehicle can be powered the renewable power source, such as the array of solar cells (436) converting solar energy to electrical energy, thereby alleviating draining of energy from the batteries (460). Each of the solar cells of an array of solar cells (436) can provide a contributing portion of the renewable electrical power, e.g., about 5-6 kW. Excess energy from the renewable energy source, such as the array of solar cells (436) can be used to recharge the batteries (460). At least periodically, e.g., once per day, once per week, the batteries (460) can be serviced and charged from other power systems, including utility power mains and fuel-powered generators.

One or more regions of the deck can be bordered by a safety railing, or similar guardrail structure. In the illustrative embodiment of FIG. 4B, the deck (406) is bordered by inner railing and balustrade (440) and outer railings (407) to allow passengers to travel freely about the deck without fear of falling overboard or through portal (432), into the open top of the observation gondola. Any suitable railing construction can suffice, such as ropes, chains, and/or rigid structures, such as tubing, fiberglass, acrylic, glass, and the like.

It should be understood that any of the various features described in the above illustrative examples can be combined in various combinations. For example, provisions for ballast can be provided in any of the vessels described herein and equivalents thereto, as may be necessary to submerge the underwater observation gondola to a sufficient depth such that the passengers are fully below the waterline. Alternatively or in addition, one or more of the underwater observation gondolas and any other hull portions that might be provided can be combined in a reconfigurable manner. Namely, the hull(s) and/or observation gondola can be reconfigured between transportation and observation modes.

Although several of the illustrative embodiments disclosed herein refer to a catamaran style vessel, it should be understood that the novel features can be embodied in various other vessel configurations. For example, a single hulled vessel can be configured with a deck above a waterline and a transparent observation gondola below the waterline formed as part of the hull. An open area above a transparent floor of the observation gondola can open to the deck providing passage for a group of passengers between the deck and the observation gondola.

Still other configurations include single or multi-hulled vessels having decks exposed to open air with more than one observation gondolas positioned below a waterline. Such observation gondolas can be positioned between hulls, within hulls, or along one or more outboard, forward or aft edges of such hulls. It should also be understood that for any of the various configurations disclosed herein, the observation gondola can be fixed with respect to the deck, or moveable, e.g., between a lowered observation configuration and a raised transport configuration.

For embodiments in which the observation gondola is formed within a hull of the water vehicle, the hull can have at least two distinct sections: an upper hull portion located largely above the waterline and a lower hull portion located largely, if not completely, below the waterline. For embodiments in which the upper and lower hull portions are constructed using different materials, the two portions can be joined together along a common seam providing a secure and watertight seal. The seam may be above or below the waterline depending upon one or more of the intended design, occupancy, operational mode, etc. It is understood that in at least some embodiments, the hull is formed without a seam, in which the upper and lower portions can be part of a common hull construction. Such a hull design can include uniform construction, for example, being formed of a homogenous material.

Although reference is made herein to vessel configurations in which decks are positioned or otherwise supported by one or more hulls above a waterline, it should be understood that other embodiments can include decks positioned at or below the waterline. Any such deck, whether above or below a waterline, should provide open access to an open top of an observation gondola, while preventing water entry to the observation gondola. For example, walls, e.g., of a hull, can serve to prevent water from flowing onto a deck positioned below a waterline, even when an area above the deck is exposed to an open atmosphere.

Figure 2:
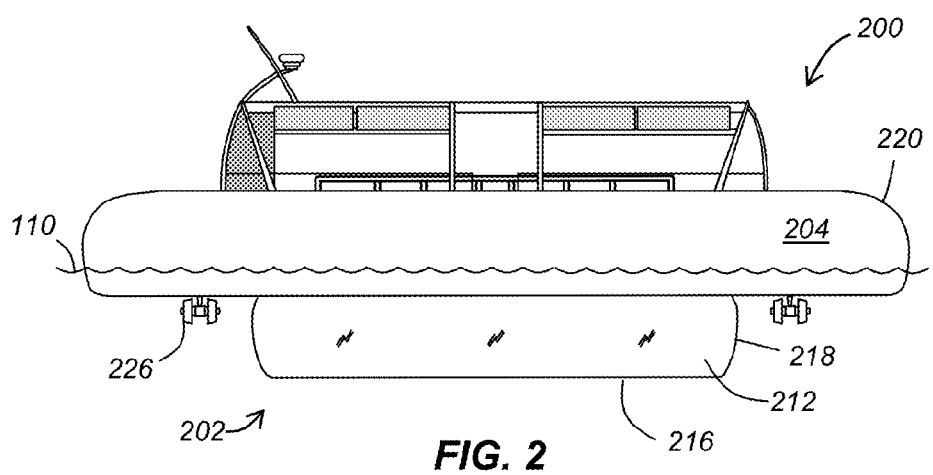
FIG. 2 is a side elevation view of an alternative embodiment of a semi-submersible watercraft.

It should be understood further that although reference is made herein to observation gondolas having an open top providing open-air access, or access to an open atmosphere, other embodiments are envisioned in which an open area above the deck is at least partially if not completely enclosed. One such example of an enclosed structure includes a vessel as illustrated in FIG. 1, 2 or 4, in which one or more walls or sides extend between the deck and a roof of the vessel. Such walls or sides can be rigid, flexible, or some combination of both. For example, the walls can include plastic, canvas or some other flexible material that can be raised or lowered. Such walls can serve to protect passengers from the elements, e.g., from rain, or to preserve some other environmental condition, e.g., heating/cooling, when necessary.

As described above, transportation modes may differ from observation modes in that they provide lass drag, thereby allowing for more efficient transport of the watercraft between destinations. In an underwater observation mode, at least a substantial portion of the observation gondola, if not the entire observation gondola, can be positioned below the waterline. As such, the observational gondola can provide a substantial drag when the water vehicle is repositioned. Since observation will typically occur at relatively low speeds, or while stationary, any drag provided by one or more of the hull(s) and/or observation gondola is inconsequential. However, during periods in which the water vehicle is traversing substantial distances and/or operating at relatively high speeds, e.g., during transport to/from a destination, the added cost in time and/or fuel due to the drag of the submerged observation gondola can be substantial.

In order to reduce the drag of the observation gondola, the water vessel can be reconfigured, for example, to raise at least a portion of the observation gondola above the waterline. Examples of such reconfigurable designs include observation gondolas that can be elevated or otherwise hoisted at least partially if not completely out of the water during periods of transportation. Such designs can include any suitable mechanism for elevating the observation gondola with respect to the waterline, such as hoists (e.g., pulleys and cables), elevators (e.g., geared linkages, electrical, hydraulics), and the like.

It should also be understood that such vessels can be configured with other features that might be found on similar excursion vehicles and vehicles commonly used in public transportation. Such features can include restroom facilities, a potable water supply, a refrigerator and/or cooler, and a source of refreshments, such as a snack bar or vending machine(s). Such features can also include entertainment features, such as audio or audiovisual systems. Such entertainment features can be used, for example, to enhance the sensory experience by providing background music, speakers, microphone and public address system, e.g., for guided tours, and/or an audio/visual component designed to supplement or otherwise enhance the passengers' experience. Such features, when included, can be provided in one or more locations, including deck or top-side and within the transparent underwater observation gondola.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention.

While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The electrical power systems can utilize common power management technologies such as replaceable and rechargeable batteries, supply regulation technologies, and/or charging system technologies for supplying energy to the various electrical systems of the water vehicle, such as propulsion, environmental control, lighting, navigation, communication, entertainment.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

In addition to avoiding a claustrophobic sensation for passengers below the waterline, the open-top configurations disclosed herein also provide an added measure of safety. Consider an emergency situation in which a traditional submarine takes on water within a passenger compartment. The traditional submarine would first have to surface, and then open a hatch to allow passengers to disembark. For high occupancy vehicles, such as those disclosed herein, the embarkation of a large number of passengers through one or more hatches would be slow, e.g., single file. In contrast, the open top configuration of the water vehicles disclosed herein would not require surfacing first, as the open top is already open above the waterline. Moreover, in the event of a flooding of the interior region of the observation gondola, the passengers would not have to disembark through a hatch in any sort of orderly fashion, e.g., single file, as they would simply float up through the open area of the portal.

In at least some embodiments, construction of the water vehicle is relatively simple and relatively easy to operate, thereby allowing for a scalable, cost effective operation. Namely, the upfront investment costs for an excursion operator are not excessive. The vessel can be operated with sufficient numbers of passengers to keep the cost-per-passenger at an acceptable value compared to other excursions, and additional vessels can be procured as needed, depending upon demand.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A water vehicle, comprising:
   a deck that accommodates a plurality of passengers;
   a hull arranged to support the deck above a waterline; and
   an observation gondola extendable below the waterline and secured relative to the deck, comprising:
   a transparent floor having a size and shape that facilitates the plurality of passengers observing an underwater environment;
   a top edge defining a perimeter of an open area directly above a portion of the transparent floor reserved for the plurality of passengers, wherein the open area is accessible from the deck; and
   a plurality of transparent walls, each wall of the plurality of transparent walls extending between the transparent floor and the top edge, wherein the transparent floor, the top edge and the plurality of transparent walls collectively define an interior region sufficiently sized to accommodate the plurality of passengers below the waterline.

2. The water vehicle of claim 1, wherein the hull comprises a plurality of hulls, and wherein the transparent floor comprises an optically transparent flat floor suspended above a transparent bottom portion.

3. The water vehicle of claim 2, wherein the transparent floor comprises:
   a plurality of transparent floor sections; and
   a frame positioned between adjacent transparent floor sections of the plurality of transparent floor sections, wherein a space between the transparent floor and the transparent bottom portion accommodates a ballast.

4. The water vehicle of claim 1, wherein a transparent wall of the plurality of transparent walls comprises:
   a plurality of transparent wall sections; and
   a frame positioned between adjacent transparent wall sections of the plurality of transparent wall sections.

5. The water vehicle of claim 4, wherein the frame comprises a mounting bracket arranged to support an auxiliary device mounted thereon.

6. The water vehicle of claim 1, further comprising a helm positioned above the deck, wherein the open area overlaps at least 50% of the transparent floor.

7. The water vehicle of claim 1, further comprising a roof suspended above the deck and overlapping the open area above the transparent floor, wherein the open area of the observation gondola is exposed to the atmosphere along a peripheral aperture defined between the roof and the deck.

8. The water vehicle of claim 1, further comprising a propulsion system to reposition the water vehicle.

9. The water vehicle of claim 1, wherein the observation gondola further comprises transparent passenger seating to accommodate a group of passengers among the plurality of passengers.

10. A method comprising:
    supporting a plurality of passengers upon a deck of a first water vehicle, wherein the deck is above a waterline;
    controlling movement of the first water vehicle from a helm positioned above the deck;
    supporting, during underwater observation, the plurality of passengers upon a transparent floor of a cabin defining an interior region sized to accommodate the plurality of passengers and having a top portal defining an open area accessible to the deck, wherein the plurality of passengers when situated within the interior region are below the waterline during the underwater observation, and wherein the plurality of passengers can observe a surrounding environment through the transparent floor;
    accommodating, by way of the top portal, an unobstructed transfer of the plurality of passengers between the deck and the interior region of the cabin, wherein the top portal is positioned above a transparent floor of the cabin; and
    exposing the interior region of the cabin to open-air by way of the top portal during the underwater observation, wherein the open area of the top portal overlaps a portion of the transparent floor that provides a viewing space.

11. The method of claim 10, wherein the plurality of passengers comprises at least forty passengers, the method comprising vertically repositioning the cabin with respect to the deck.

12. The method of claim 10, further comprising shading from solar exposure a portion of the deck and the top portal without obstructing the exposing of the interior region of the cabin to the open-air.

13. The method of claim 10, further comprising controllably transporting the first water vehicle during the underwater observation.

14. The method of claim 10, further comprising:
positioning the first water vehicle at a location destination separated from a point of embarkation; and
transporting by way of a second water vehicle a group of the plurality of passengers between the point of embarkation and the first water vehicle at the location destination.

15. A system comprising:
a first hull;
a second hull substantially parallel to the first hull and spaced apart from the first hull;
a deck supported upon a top surface of a bridge coupled to the first hull and the second hull, wherein the deck is located above a waterline;
a helm positioned above the deck, wherein the helm permits a controlled movement of the system in an aqueous environment; and
a gondola, having an interior region and a top portion defining a portal, wherein the gondola is secured with respect to the deck when configured for underwater observation, wherein the interior region of the gondola extends below the waterline to accommodate a plurality of adult human passengers below the waterline to observe an underwater environment, wherein the gondola comprises:
a transparent floor;
a top portion positioned above the transparent floor and including a portal defining an open area overlapping a portion of the transparent floor having a size and shape that facilitates the plurality of adult human passengers observing an underwater environment; and
a plurality of transparent walls extending between the transparent floor and the top portion.

16. The system of claim 15, further comprising a passageway disposed between the deck and the transparent floor, by way of the portal to allow the plurality of adult human passengers to move freely between the interior region of the gondola and the deck.

17. The system of claim 15, wherein the top portion including the portal comprises top portions of each wall of the plurality of transparent walls.

18. The system of claim 15, further comprising:
a renewable energy generation system; and
an energy storage system coupled to the renewable energy generation system to store energy generated by the renewable energy generation system.

19. The system of claim 15, wherein the gondola can be raised and lowered with respect to the deck.

20. The system of claim 15, wherein a single transparent member comprises a wall of the plurality of transparent walls and the transparent floor.

* * * * *